US012337341B2

(12) United States Patent
Fetko

(10) Patent No.: US 12,337,341 B2
(45) Date of Patent: Jun. 24, 2025

(54) HVAC ROUND PIPE SEALED FITTINGS

(71) Applicant: Ductmate Industries, Inc., Charleroi, PA (US)

(72) Inventor: Duane E. Fetko, Masontown, PA (US)

(73) Assignee: DMI Companies, Inc., Charleroi, PA (US)

( * ) Notice: Subject to any disclaimer, the term of this patent is extended or adjusted under 35 U.S.C. 154(b) by 756 days.

(21) Appl. No.: 17/123,464

(22) Filed: Dec. 16, 2020

(65) Prior Publication Data

US 2021/0101173 A1 Apr. 8, 2021

Related U.S. Application Data

(62) Division of application No. 13/095,253, filed on Apr. 27, 2011, now Pat. No. 10,898,920.

(60) Provisional application No. 61/329,388, filed on Apr. 29, 2010.

(51) Int. Cl.
*B05C 5/02* (2006.01)
*F24F 13/02* (2006.01)

(52) U.S. Cl.
CPC ........ *B05C 5/0216* (2013.01); *F24F 13/0209* (2013.01); *F24F 13/0245* (2013.01); *Y10S 285/915* (2013.01); *Y10T 156/10* (2015.01)

(58) Field of Classification Search
CPC . B05C 5/0216; F24F 13/0209; F24F 13/0245; Y10S 285/915; Y10T 156/10
USPC .............................................. 285/179.2, 424
See application file for complete search history.

(56) References Cited

U.S. PATENT DOCUMENTS 2,398,788 A * 4/1946 Hedrick .............. F01N 13/1805
285/915
2,878,838 A * 3/1959 Budge ..................... F16L 41/02

* cited by examiner

*Primary Examiner* — Greg Binda
(74) *Attorney, Agent, or Firm* — The Webb Law Firm

(57) ABSTRACT

A manufactured sealed latched sheet metal circular HVAC fitting including a first subcomponent having a HVAC end and a first subcomponent coupling, a second subcomponent having a HVAC end and a second subcomponent coupling, sealant on the first subcomponent or the second subcomponent, and a sealed latched joint created by the connection of the second subcomponent coupling with the first subcomponent coupling, the sealed latched joint using the sealant on the first subcomponent or the second subcomponent as part of the sealed latch joint.

12 Claims, 4 Drawing Sheets

HVAC ROUND PIPE SEALED FITTINGS

CROSS REFERENCE TO RELATED APPLICATIONS

This Application is a Divisional Application of U.S. application Ser. No. 13/095,253, filed on Apr. 27, 2011, which issued as U.S. Pat. No. 10,898,920 on Jan. 26, 2021, which claims the benefit of U.S. Provisional Application No. 61/329,388 filed on Apr. 29, 2010, the contents of which are hereby incorporated by reference in their entirety.

BACKGROUND OF THE INVENTION

Field of the Invention

This invention relates in general to fittings used in connection with ductwork in the HVAC industry. Specifically this invention relates to creating a seal in the joint of a fitting.

Description of Related Art

Round snaplock pipe and associated fittings are used within residential HVAC systems and the low pressure portions of commercial and industrial HVAC systems. It is advantageous for many reasons that the system be leak free.

It is common in the HVAC industry to install the HVAC system and after installation attempt to seal all joints and seams as well as any potential voids that offer the opportunity for leaks in the system by painting the system with a duct sealant to seal said air leaks. This process is time consuming, difficult and often ineffective due to the ductwork being located high in the air, within concealed spaces or immediately adjacent to other building components.

Recent technological advances have led to the development of sealed snaplock pipe that does not require the application of duct sealant after installation. Examples of sealant being used on snaplock pipe can be seen in U.S. Pat. Nos. 7,478,467 and 7,708,034 However there are no known manufactured fittings that have a sealed latch connection wherein the latch contains sealant.

It would be possible to apply the known in the art duct sealant that is painted on to the fittings prior to installations either by the manufacturer or installer but the process has the following disadvantages:

1. It is messy and time consuming and the duct sealant must be allowed to dry for an extended time prior to shipping or installation;
2. The sealant and brush marks on the fitting are not as aesthetically pleasing as the remainder of the system without duct sealant; and
3. Applying the duct sealant to the interior of the fitting would be time consuming, likely ineffective due to the size of the fittings and not desirable due to the potential for fumes and odors that may be introduced to the conditioned air.

BRIEF SUMMARY OF THE INVENTION

This invention provides for a method for creating a sealed latched sheet metal HVAC fitting comprising providing a first subcomponent; providing a second subcomponent; applying sealant to the first subcomponent or the second subcomponent; and joining the first subcomponent to the second subcomponent by creating a first subcomponent coupling on the first subcomponent, creating a second subcomponent coupling on the second subcomponent, and using the first subcomponent coupling, the second subcomponent coupling and the sealant to join the first subcomponent to the second subcomponent to create a manufactured sealed latched sheet metal circular HVAC fitting having a sealed latched joint. The method can include creating a guide for the sealant. The guide for the sealant can be a bead. The sealant can be applied to the bead evenly and may not leak out after the first subcomponent is joined to the second subcomponent. The first subcomponent can be a collar; the second subcomponent can be a boot; and the bead can be created in the collar. The first subcomponent can be a collar and the second subcomponent can be an angular conical section. A third subcomponent can be provided wherein the first subcomponent can be a collar; the second subcomponent can be an angular reducer; and the third subcomponent can be a reducer connector. The sealant can be a hot-melt sealant.

This invention also provides for a sealed latched sheet metal HVAC fitting having a first subcomponent having a HVAC end and a first subcomponent coupling; a second subcomponent having a HVAC end and a second subcomponent coupling; a latch created by the connection of the second subcomponent coupling with the first subcomponent coupling; and a sealant within the latch. Part of the latch can include a bead and the sealant can be located within the bead in the latch. The sealant can be a hot-melt sealant. The first subcomponent can be a collar and the second subcomponent can be a boot. Alternatively, the first subcomponent can be a boot and the second subcomponent can be a collar.

This invention also provides for an apparatus for applying a sealant to a subcomponent of a sealed latched sheet metal HVAC fitting having a structural base; a subcomponent holder attached and supported by the base; a rotational drive connected to the subcomponent holder that causes a subcomponent to rotate when placed in the subcomponent holder; a nozzle used to insert sealant into the subcomponent as it rotates supported by the base; and a controller used to operate the nozzle, the rotational drive, and the subcomponent holder.

BRIEF DESCRIPTION OF THE SEVERAL VIEWS OF THE DRAWING(S)

DETAILED DESCRIPTION OF THE INVENTION

Definitions

Figure 7:
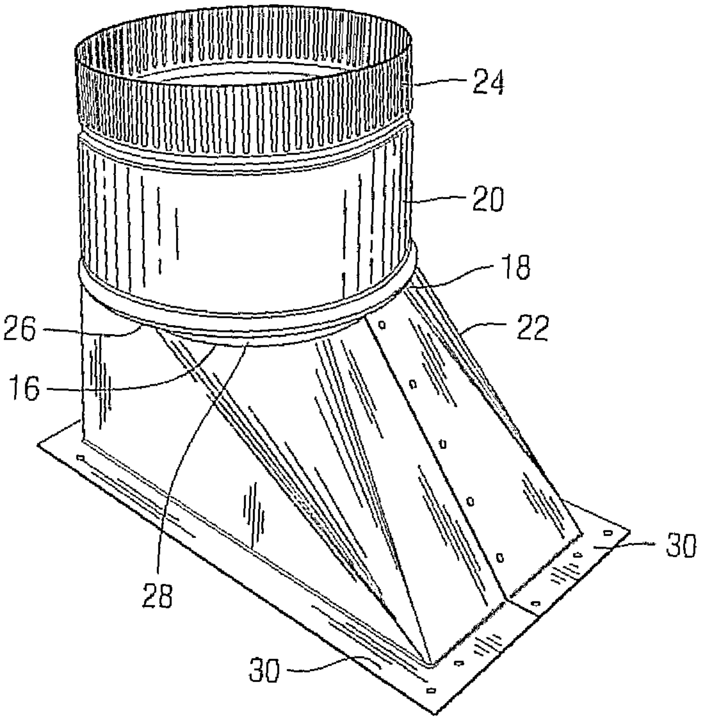
FIG. 7 shows a manufactured sealed latched sheet metal HVAC fitting.

"a manufactured sealed latched sheet metal HVAC fitting"—a sheet metal piece used to connect two pieces of ductwork (which could include fittings) or used to connect ductwork to an end point. A fitting is made of more than one part and joined by mechanical connection such as a grooved joint wherein metal of the two parts are formed by a forming machine. A manufactured sealed latched sheet metal HVAC fitting is an HVAC fitting which is sold as one piece that is constructed of two or more parts having a latched connection that has sealant in the latch connection when it is manufactured that reduces air leakage from the HVAC fitting when the fitting is placed in an HVAC system. The mechanical connection or latch connection is meant to be permanent such that once it is formed it is not meant to be separable. An installer can take the manufactured sealed latched sheet metal HVAC fitting and without applying any sealant install it in an HVAC system and air will not leak out of the integral joints of the fitting. The integral joins are joints within the fitting itself and not connections to other pieces of HVAC ductwork. An example of such a fitting is a take-off as shown in FIG. 7. The connection can be made by a COLATCH® machine made by Iowa Precision Industries Inc. or other manufactured machines that create a similar connection. The connection can be referred to as a latch which is made by a machine and forms a connection by forming the metal together. In the case of the take-off a boot is joined with a collar to create the fitting. Other examples of fittings that can be sealed reducers, conicals, crd/boot assemblies, and elbows.

"liquid applied sealant"—any liquid applied sealant that becomes solid. It is preferred that the sealant becomes solid in under five minutes. It is something that can be dispensed or pumped and then changes states to a more solid type structure. It could be anything that changes states, such as a chemical reaction or changes in temperature. Once it changes state it must stay bonded to substrate and solid enough so that it does not migrate during the latching or connecting the product.

"a first subcomponent"—one part of the fitting. By way of example, it could be a collar or a boot.

"a second subcomponent"—a second part of the fitting. By way of example it could be a collar or a boot.

"a bead in either the first subcomponent or the second component"—a groove or indentation in the sheet metal that can protrude outwardly on the outer surface of either the first or second subcomponent or inwardly on the inner surface of either the first of second subcomponent.

"a bead"—a groove or indentation in the sheet metal that can protrude outwardly on the outer surface or inwardly on the inner surface.

"applying a sealant to the bead"—inserting any sealant in the bead.

"joining the first subcomponent to the second component"—creating a mechanical connection between the subcomponents. An example of the connection can be made by a COLATCH® machine made by Iowa Precision Industries Inc. This could be accomplished by forming beads or grooves in the two parts so that they are joined or latched together mechanically.

"using the bead with the sealant as part of the joining connection"—the bead containing the sealant is part of the mechanical connection. An example is the bead created can be used as part of the connection created by the COLATCH® machine made by Iowa Precision Industries Inc.

"applied to the bead evenly"—uniformly deposited in the bead so that it does not flow out in places when it is part of the connection. Or is essentially continuous and having consistent height and width within plus or minus 50%. It is to be essentially continuous and have a consistent height and width within plus or minus 50 so that air does not leak out of either gaps within the sealant if it is not continuous or gaps created by the sealant if it does not have a consistent height and width.

"the sealant does not leak out after the first subcomponent is joined to the second subcomponent"—no sealant is on the outside of the ductwork after the connection and no sealant is left in the machine.

"a collar"—a circular sheet metal connection portion of a fitting.

"a boot"—a rectangular sheet metal connection portion of a fitting. It can taper or transition into a circular portion.

"a hot-melt sealant"—a polymer used to prevent air leakage having, thermoplastic properties, wherein it favors the liquid state when heated and the solid or semi solid state when cooled. This hot melt sealant may be a polymer as previously defined with the addition of additives, fillers, or other materials chemically different than the polymer, yet incorporated, resulting in a modified substance. The liquid state as sited in the definition of a hot melt sealant includes, but is not limited to, any state of the hot melt sealant where its flow of matter provides for process application as would not be possible otherwise. The solid or semi solid state as sited in the definition of a hot melt sealant includes, but is not limited to, any state of the hot melt sealant where its flow of matter does not provide for process application. Process application as sited in definitions for the liquid, solid and semi solid state includes any method of applying the hot melt sealant in the context of the system that this patent encompasses. An example of a hot melt sealant is Q41 RoboFoam Mastic Sealant produced by Edge Adhesive.

"a first subcomponent having a HVAC end"—one part of the fitting having an end for connection to HVAC ductwork or a termination point or end that could be a register box or a cap. It could be a collar or a boot.

"a first subcomponent coupling"—one part of the fitting having an end that is going to be used to connect to the second subcomponent. This could be a female latched connection or a male latched connection.

"a second subcomponent having a HVAC end"—a second part of the fitting having an end for connection to HVAC ductwork or a termination point or end that could be a register box or a cap. It could be a collar or a boot.

"a second subcomponent coupling"—a second part of the fitting having an end that is going to be used to connect to the second subcomponent to the first subcomponent. It could be a male or female connection that corresponds to the first subcomponent coupling.

"the second subcomponent joined to the first subcomponent coupling"—a second part of the fitting having an end that is going to be used to connect to the first subcomponent.

"a bead in the first subcomponent coupling"—a groove or indentation in the sheet metal that protrudes outwardly on the outer surface of the first subcomponent or inwardly on the inner surface of the first subcomponent.

"a sealant within the bead"—sealant on the inside portion of the bead.

"a structural base"—support system for supporting components.

"a subcomponent holder"—a device that holds the subcomponent.

"attached and supported by the base"—connected to and held by the base.

"a rotational drive"—a device that can be used to rotate a subcomponent.

"connected to the subcomponent holder"—attached to the subcomponent holder.

"cause a subcomponent to rotate when placed in the subcomponent holder"—the subcomponent rotating around the axis.

"a nozzle used to insert sealant into the subcomponent as it rotates"—device used to place sealant on the subcomponent as the subcomponent rotates.

"a controller used to operate the nozzle, the rotational drive, and the subcomponent holder"—a computer device used to interface with peripheral devices. The device will operate the nozzle, the sealant and the rotational drive so that when the subcomponent is inserted in the apparatus, sealant is inserted while the subcomponent is rotated.

"male latched connection"—a part of the joining connection that goes into the other piece of the joining connection.

"female latched connection"—a part of the joining connection that receives the other piece of the joining connection.

"latched" creating an integral permanent locking joint by forming 2 pieces of metal together so that it is connected and does not need rivets, staples, or welds. An example is the co-latch joint created by the Co-Latch® joint forming machine wherein male and female parts are formed simultaneously or concurrently to create an integral permanent joint. The following examples are not latched for the purposes of this application as they are not integral permanent:

i. A snap locking mechanism such as reeves or button locks;
ii. the male crimped and female ends of pipe;
iii. the bending of the tab.

"a guide for the sealant"—a registration that provides a location for application of the sealant.

"sealant" a material used to reduce air leakage.

"a sealed latch joint created by the connection of the second subcomponent coupling with the first subcomponent coupling"—the mechanical connection between the two subcomponent. This joint could be created by a COLATCH® machine in accordance with the teachings of this invention.

"manufactured sealed" means that when the fitting was created it has sealant on the latch connection. This would not include adding sealant by an installer.

"Sealed" means that air leakage is reduced.

"Circular" means that the fitting will work with a system containing pipe having a circular cross section.

"applying a sealant to the first subcomponent or the second subcomponent" means placing a sealant on either the first subcomponent or second subcomponent for the intended purpose of it being used as part of the latched connection.

"sealant on the first subcomponent or the second subcomponent" sealant placed on the either the first subcomponent or the second subcomponent for the purpose of it being used as part of the latched connection.

"creating a first subcomponent coupling on the first subcomponent" means forming or placing a coupling on the first subcomponent. It can be either a male or female latched connection. This can be done simultaneous with joining of the first subcomponent to the second subcomponent.

"creating a second subcomponent coupling on the second subcomponent coupling" means forming or placing a coupling on the second subcomponent. It can be either a male or female latched connection. This can be done simultaneous with joining of the first subcomponent to the second subcomponent.

"using the first subcomponent coupling, the second subcomponent coupling, and the sealant to join the first subcomponent to the second subcomponent to create a manufactured sealed latched sheet metal circular HVAC fitting having a sealed latched joint" an example of this is using a COLATCH® machine to create a fitting by placing a sealant on one of the parts of the fitting.

PARTS LIST

2 apparatus for applying sealant to a subcomponent
4 structural base
6 subcomponent holder
8 rotational drive
10 nozzle
12 controller
14 bead
16 sealant
18 sealed latched sheet metal HVAC fitting
20 first subcomponent
22 second subcomponent
24 HVAC end
26 first subcomponent coupling
28 second subcomponent coupling
30 HVAC end

DESCRIPTION

The manufacturing process for most types of fittings includes a process of joining two cylindrical or semi-cylindrical subcomponents by a process called co-latching. The two subcomponents are placed in a co-latching machine in their appropriate locations with respect to each other. The machine then joins the two parts by forming a permanent integral mechanical joint between them. This joint while being structurally sound is prone to air leakage and is meant to be a permanent joint and is not undoable without tools or without bending the sheet metal.

It would be possible to apply a common liquid sealant or mastic to the metal prior to co-latching but the sealant would splatter and migrate during the joining process, contaminating the product and the co-latch machine. If the sealant migrates and splatters it may compromise the true intention of sealing the joint because leaks may then occur.

One aspect of the invention relates to the manufacturing process:

Forming a circumferential sealant pocket or bead on the interior of one of the subassemblies;
Applying a sealant to the pocket; and
Allowing the sealant to solidify to a consistency so that it stays bonded to the sheet metal and so that it does not migrate prior to or during the co-latching process.

A second aspect of the invention relates to a machine that automatically applies the sealant into the sealant pocket described above.

A third aspect of the invention is the sealed co-latch joint itself.

Figure 1:
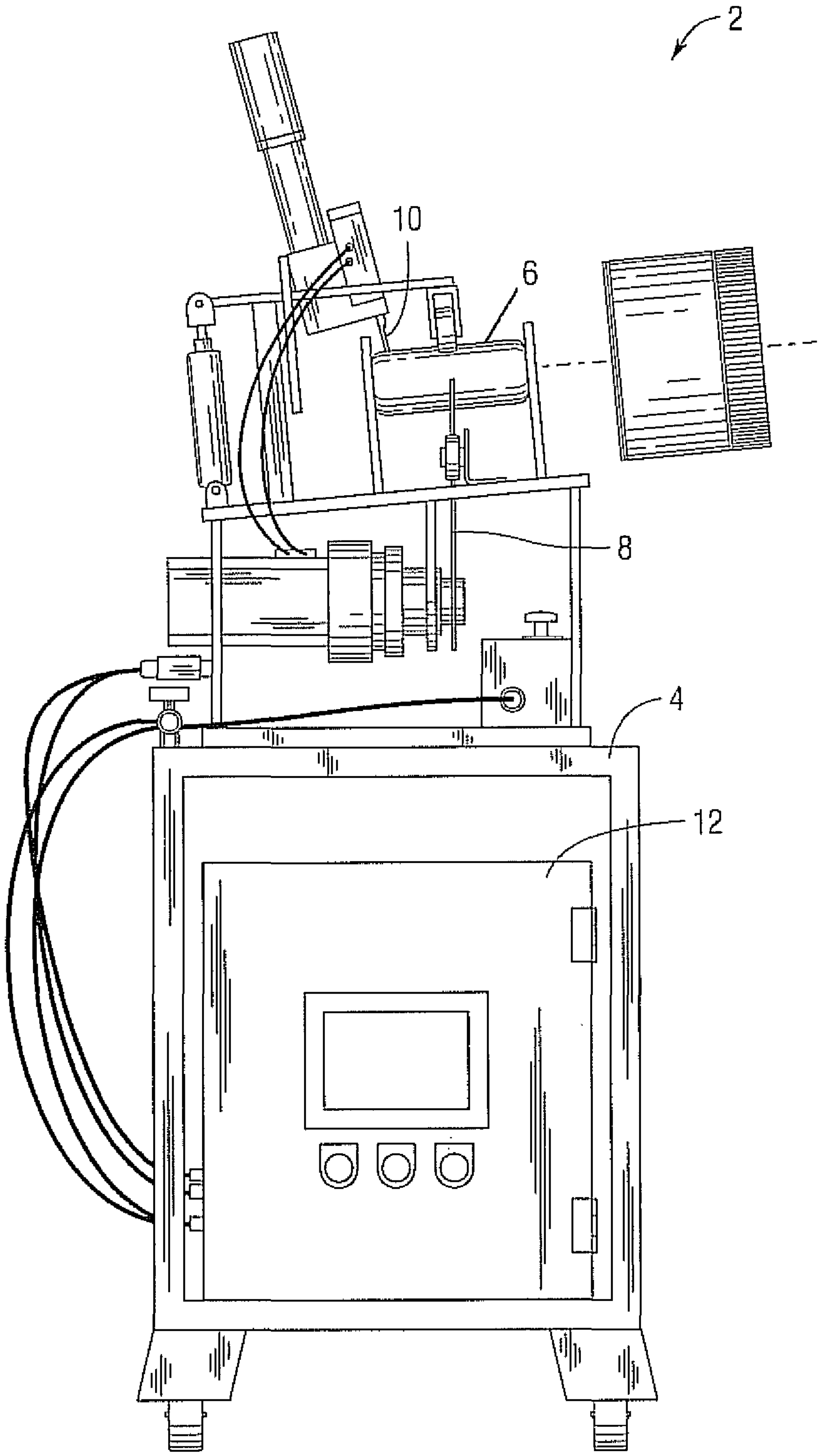
FIG. 1 is a front view of an apparatus for applying sealant to subcomponent.

FIG. 1 shows an apparatus for applying sealant to a subcomponent (the "apparatus") 2. The apparatus 2 has a structural base 4 which supports a subcomponent holder 6, a rotational drive 8, nozzle 10, and controller 12. The subcomponent holder 6 is used to hold a subcomponent such as a collar. The subcomponent holder 6 is connected to the rotational drive 8 so that when a collar is inserted the rotational drive 8 causes the collar to turn about its axis. While the collar is rotating, the nozzle 10 inserts a sealant, into a bead 14 in the collar. The sealant in the preferred embodiment is a hot melt sealant. An example of the hot melt sealant is one that is sold by Edge Adhesives under the trademark Q41. Because the collar is rotating when in the apparatus 2, the sealant is able to be applied evenly.

Figure 2:
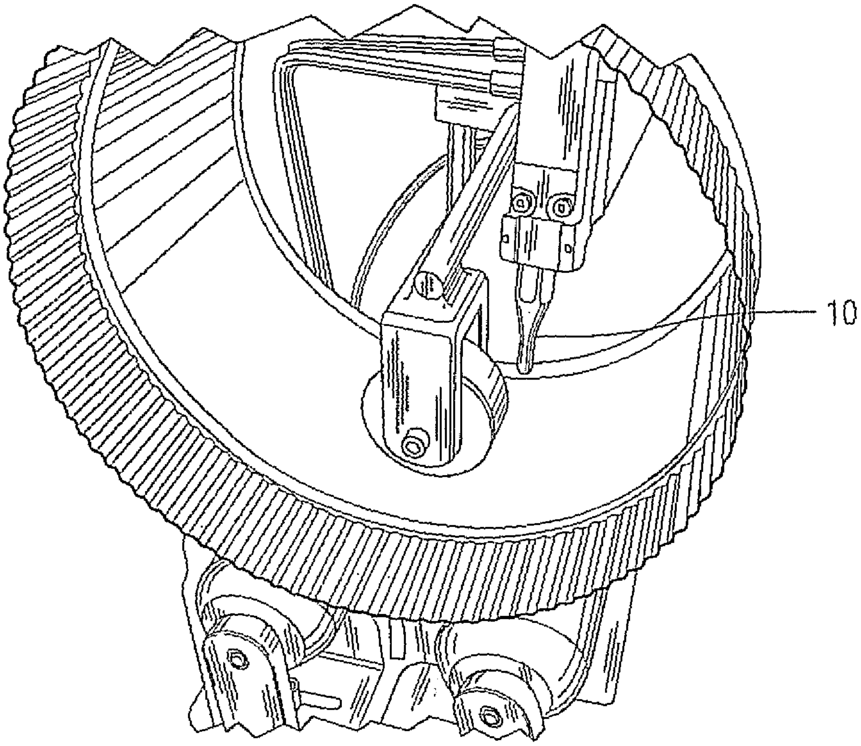
FIG. 2 shows a collar in place with the nozzle or gun down.

FIG. 2 shows a subcomponent in the apparatus 2.

Figure 4:
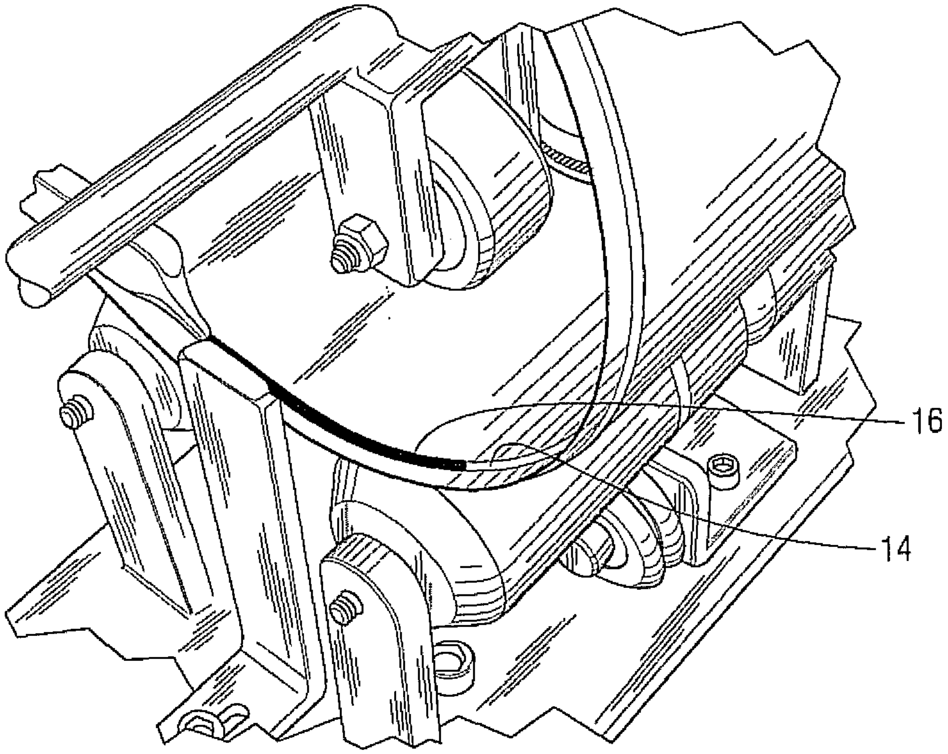
FIG. 4 shows a rear view of a gasket or sealant being applied to a transverse seam of a collar.
Figure 5:
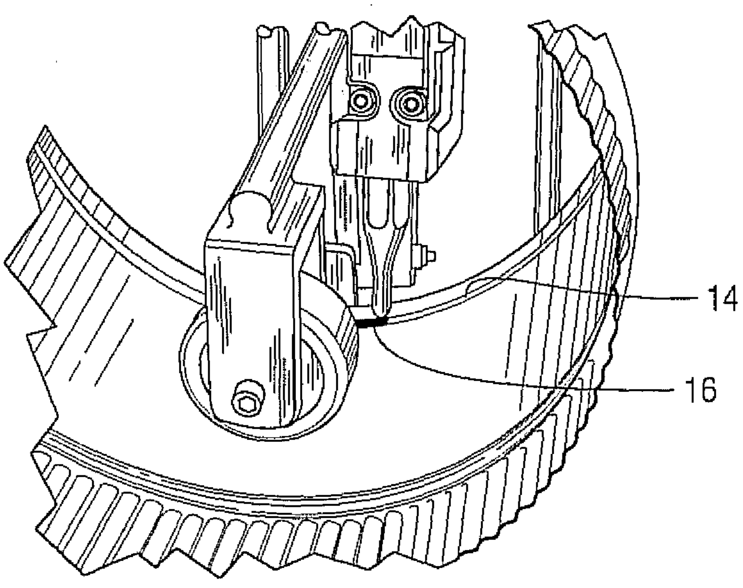
FIG. 5 shows a front view of a gasket or sealant being applied to a transverse seam of a collar.

FIG. 4 shows a bead 14 and a sealant 16 being applied to the bead 14.

FIG. 7 shows a manufactured sealed latched sheet metal HVAC fitting 18. The manufactured sealed latched sheet metal HVAC fitting 18 shown in FIG. 7 is commonly referred to as a take-off fitting. First subcomponent 20 is a collar and has a HVAC end 24 and a first subcomponent coupling 26. Second subcomponent 22 is a boot and has a HVAC end 30 and a second subcomponent coupling 28 (essentially covered by first subcomponent coupling 26). In a preferred embodiment the first subcomponent coupling 26 has a bead 14 with the inner portion of the bead 14 having sealant 16 (can be seen in FIG. 4). The sealant 16 can be a hot-melt sealant. The manufactured sealed latched sheet metal HVAC fitting 18 is created by using a COLATCH® machine. The COLATCH® machine simultaneously creates the couplings and the latched connection. Prior to placing the first subcomponent 20 and the second subcomponent 22 into the COLATCH® machine a bead 14 can be placed in the first subcomponent 20. After the bead 14 is placed in the first subcomponent 20 it is placed into an apparatus for applying sealant to a subcomponent 2 so that sealant 16 can be applied. After the sealant 16 is applied to the bead 14 the first subcomponent 20 and the second subcomponent 22 are placed in the COLATCH® machine and the parts are joined so that the connection is sealed. While the preferred embodiment has a bead 14 the bead is not necessary and instead the sealant can be placed into the female latched connection or the male latched connection. There could also be a guide used instead of a bead.

Figure 3:
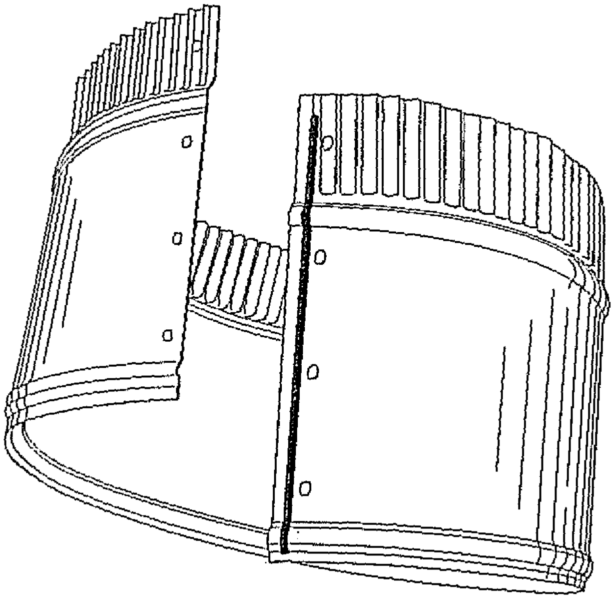
FIG. 3 shows a collar with a gasket or sealant on the longitudinal seam.
Figure 6:
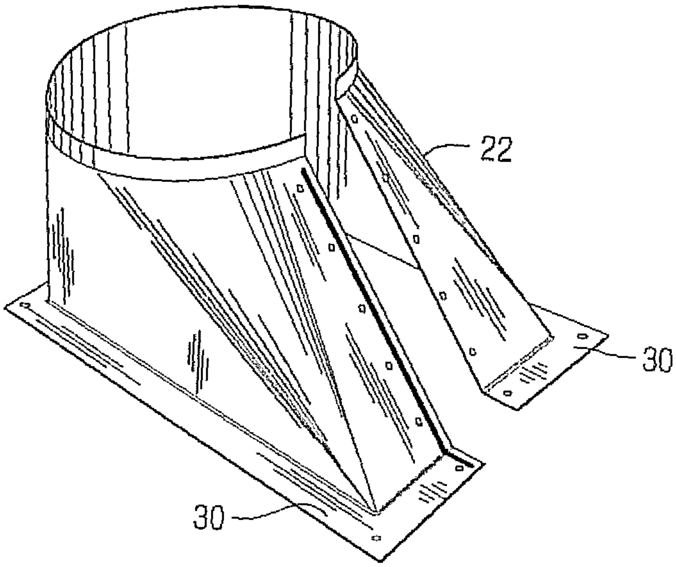
FIG. 6 shows a boot blank with gasket or sealant applied.

The longitudinal seam(s) on the latched HVAC fitting can be sealed. The sealant used to seal the longitudinal seam can be a liquid applied sealant or a hot melt sealant. If it is a hot melt sealant, Edge Adhesives trademark sealant Q41 could be used. FIGS. 3 and 6 show sealant applied to the longitudinal seams.

Various changes can be made to the above construction method without departing from the scope of the invention as defined in the claims below. It is intended that all matter contained in the above description as shown in the accompanying drawings shall be interpreted as illustrative and not as a limitation.

The invention claimed is:

1. A manufactured sealed latched sheet metal circular HVAC fitting, comprising:
- (a) a first subcomponent having:
  - a HVAC end configured to engage HVAC ductwork or an end comprising a register box or a cap; and
  - a first subcomponent coupling;
- (b) a second subcomponent having:
  - a HVAC end configured to engage HVAC ductwork or an end comprising a register box or a cap; and
  - a second subcomponent coupling;
- (c) sealant on the first subcomponent or the second subcomponent; and
- (d) a sealed latched joint created by the connection of the second subcomponent coupling with the first subcomponent coupling, the sealed latched joint uses the sealant on the first subcomponent or the second subcomponent as part of the sealed latch joint.

2. A manufactured sealed latched sheet metal circular HVAC fitting as recited in claim 1, wherein part of the latch includes a bead and the sealant is located within the bead in the latch.

3. A manufactured sealed latched sheet metal circular HVAC fitting as recited in claim 1, wherein the sealant is a hot-melt sealant.

4. A manufactured sealed latched sheet metal circular HVAC fitting as recited in claim 1, wherein the first subcomponent is a collar and the second subcomponent is a boot.

5. A manufactured sealed latched sheet metal circular HVAC fitting as recited in claim 4, wherein the HVAC end of the boot defines an HVAC opening and the second subcomponent coupling of the boot defines a coupling opening, and wherein the HVAC opening has a rectangular cross-sectional shape and the coupling opening has a circular cross-sectional shape.

6. A manufactured sealed latched sheet metal circular HVAC fitting as recited in claim 1, wherein the first subcomponent is a boot and the second subcomponent is a collar.

7. A manufactured sealed latched sheet metal circular HVAC fitting as recited in claim 6, wherein the HVAC end of the boot defines an HVAC opening and the first subcomponent coupling of the boot defines a coupling opening, and wherein the HVAC opening has a rectangular cross-sectional shape and the coupling opening has a circular cross-sectional shape.

8. A manufactured sealed latched sheet metal circular HVAC fitting as recited in claim 1, wherein the sealant is a liquid applied sealant.

9. A manufactured sealed latched sheet metal circular HVAC fitting as recited in claim 1, wherein the sealant is applied evenly.

10. A manufactured sealed latched sheet metal circular HVAC fitting as recited in claim 1, wherein the first component comprises a longitudinal seam extending between the HVAC end and the first subcomponent coupling or the second component comprises a longitudinal seam extending between the HVAC end and the second subcomponent coupling, and wherein the longitudinal seam is sealed with another sealant.

11. A manufactured sealed latched sheet metal circular HVAC fitting as recited in claim 10, wherein the longitudinal seam is sealed with the another sealant upon engaging of the first subcomponent coupling with the second subcomponent coupling.

12. A manufactured sealed latched sheet metal circular HVAC fitting as recited in claim 10, wherein the another sealant comprises a liquid applied sealant or a hot melt sealant.

* * * * *